Jan. 19, 1954  E. B. FERNBERG  2,666,245
FASTENER
Filed Sept. 6, 1950
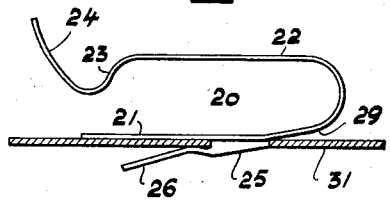
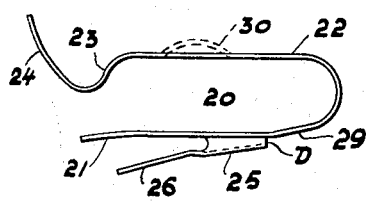
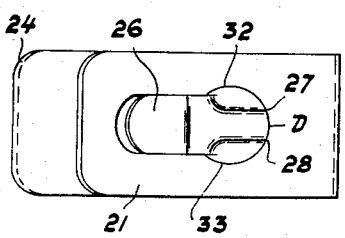
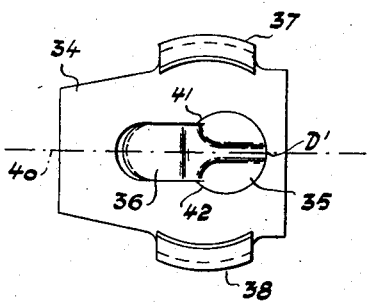
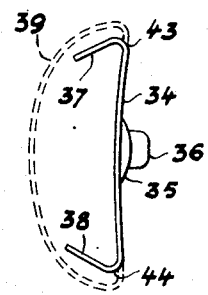
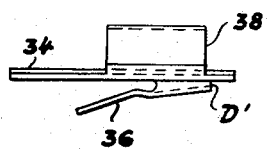
Inventor
Eric B. Fernberg
By Malcolm W. Fraser
Attorney Patented Jan. 19, 1954

2,666,245

UNITED STATES PATENT OFFICE 2,666,245

FASTENER

Eric Birger Fernberg, Pinner, England

Application September 6, 1950, Serial No. 183,407

Claims priority, application Great Britain
September 6, 1949

4 Claims. (Cl. 24—259)

The present invention relates to an improved fastener or clip, suitable for securing an article against a flat panel, by removable engagement of a part of the fastener or clip in a hole in the panel.

A known clip designed for this purpose comprises a flat strip of spring metal, one portion of which, the body portion, lies flat against the panel with its end engaging in a hole in the panel, while another portion is formed as a spring loop so shaped as to hold an article such as a cable against the panel. Such a clip suffers from the disadvantage that where the hole in the panel is small, as is often necessarily the case, the width of the strip must also be small enough to pass into the hole, with the result that the whole clip is too weak for many purposes for which it would otherwise be suitable.

Another known clip which avoids this difficulty has a panel-engaging tongue sheared and bent out of the central portion of the body of the clip, so that the width of the tongue is less than the full width of the strip and thus the strengh of the article-engaging portion of the clip is not limited by the size of the panel-engaging portion. Nevertheless this clip suffers from the disadvantage that while it can be manually engaged in the panel hole only with difficulty and often with damage to the surface of the panel, it has a tendency to slip far too easily out of the panel hole. In order to avoid this difficulty, the next step in development was to shear out of the body of the clip a small detent spaced from the root of the tongue, pointing away from the tongue and which engaged in the hole at the side thereof opposite the root of the tongue. This was effective in preventing the tongue from slipping too easily out of the hole, but had the disadvantage of being very weak because the detent was sheared from the body on three of the sides. Since the panel-engaging portion of such clips are of less width than the full width of the strip from which they are formed, it is particularly desirable that the strength of the panel-engaging portion should be a maximum, which in several respects, apart from those mentioned above, is not the case with these known clips.

Accordingly, one object of this invention is to provide a clip, the strength of which is not entirely limited by the size of the hole in which it is engaged.

Another object is to enable the clip to be applied to and engaged in a panel from the same side as the article is to be held against the panel.

Other objects are to provide improved means for ensuring that the clip does not disengage easily from the panel, to increase the strength (for a given size) of the panel-engaging portion of the clip, to enable the clip to be engaged and disengaged in the panel easily and with minimum damage to the panel, and to permit the clip to be rotated in the panel about an axis normal to the panel.

Other objects and advantages of the invention will become apparent from the following description of two preferred varieties of it.

In the accompanying diagrammatic drawings,

Figures 1 and 2 are respectively an underplan and an elevation of a clip suitable for holding a cable to the panel body of a vehicle, Figure 3 shows the same clip assembled in the panel, Figures 4, 5 and 6 are respectively a plan, elevation and end elevation of a clip suitable for holding a beading to a panel.

The clip illustrated in Figures 1, 2 and 3 and indicated generally at 20 is formed from a single rectangular strip of spring steel by bending the strip about parallel lines to the U-shape shown. The limb 21 of the clip will be called the body of the clip and is slightly bowed, whilst the other limb 22 constitutes a spring finger and is turned inwardly at 23 and then outwardly at 24.

The body 21 is also formed with a downwardly convex depression 25 and a resilient tongue 26. The depression 25 is for the most part pressed out of the body but is sheared right through between the points 27 and 28 to form what will be called a detent D. Although of roughly V-section (viewed along a line transverse to the strip) the depression is of circular profile in plan view.

That portion 29 of the body 21 lying behind the detent D, i. e. remote from the tongue, is inclined slightly to the main flat plane of the body for a reason to be explained later.

The limb 22 may be formed with a part-cylindrical bend 30 shown in broken lines.

As shown in Figure 3 the tongue 26 is used to attach the clip to a panel 31 of an automobile. For this purpose the panel is formed with a circular hole through which the tongue 26 is pushed until the depression 25 registers with, and slips into, the circular hole. Thereafter the detent D at the back of the depression 25 and the forward edges 32 and 33 of the depression prevent the clip from moving with respect to the panel except angularly about an axis normal to the body of the clip.

The clip is intended to hold pipes, cables, electric wiring flex or the like to the face of the panel, and the pipes or the like are forced into the clip so as to be held in the U-portion of the clip behind 23, for example in the bend 30 in which case the pipes are prevented from twisting in relation to the clip. The fact that the clip can be rotated in the hole enables the clip to receive pipes lying against the vehicle at any angle.

It is to be noted that the bowing of the body 21 puts a tension on the tongue 26 when the clip has been assembled in the panel.

If the portion 29 of the body of the clip were flat against the panel (Figure 3), then when the flared mouth 24 of the clip was opened upon insertion of a pipe or the like, the depression 25 would tend to be forced out of its hole and it is to prevent this that the portion 29 is inclined or radiused with respect to the surface of the panel, to provide a clearance with respect to the panel. This is not necessary where the bend of the U of the clip starts immediately behind the detent D.

It will be seen that the depression 25 is formed as a continuation of the tongue 26 by deforming the body 21 of the clip continuously from the tip of the tongue to the detent D at the back of the depression. It follows that the panel-engaging portion is given added strength and in use there is no sharp projection which might scratch the paintwork on the frame as the clip is being inserted in its hole. The clip is located in the hole by the detent D and the abutment constituted by the forward edges 32 and 33 of the depression.

The clip illustrated in Figures 4, 5 and 6 is intended to secure a beading to a panel. For this purpose there is formed in the body 34 of the clip an outwardly convex depression 35 and a tongue 36, similar in all respects to the depression and tongue shown in Figure 1. The end D¹ of the depression opposite the tongue thus forms a detent.

The clip is designed, as in the previous case, to clip into a hole formed in the sheet metal panel of an automobile and thus hold the clip to the panel.

The clip is also formed with a pair of bowed, arcuate lugs 37 and 38 with the aid of which a beading 39 of C-section may be secured to the panel.

Finally the body 34 of the clip is bowed about a longitudinal axis 40.

In use the automobile panel is formed with a series of preferably circular holes spaced out along the centre line of the position to be occupied by a beading. Into each of these holes a clip of the kind illustrated is secured by clipping the tongue 36 into the hole and behind the panel, the forward edges 41 and 42 of the depression 35 constituting an abutment and engaging one side of the hole while the detent D¹ engages the opposite edge of the hole to register the clip in the hole. Thereafter, the beading 39 of C-section is secured to the several clips by snapping the spaced flanges of the beading over the lugs 37, 38 of the clips.

When the clip is first applied to the panel it is only the curved lines 43 and 44 of the body which touch the face of the panel, but as the tongue 36 is forced into and behind the hole, the bowed body straightens and is placed in tension so that the clip is held tightly to the panel by virtue of the fact that the panel is gripped between the tongue and body of the clip.

The body of the clip may be formed with means other than the lugs 37, 38 for holding a member to the panel.

Either of the devices described may be varied by altering the shape of the depression so that it fits a hole which is other than round. The depressions described will fit round, square or rectangular holes, but if elongated for example they will fit oval holes.

What I claim is:

1. A clip for securing an article to an apertured panel, comprising an approximately flat body of spring strip metal, article-engaging means integral with said body, a depressed portion on said body adapted to project into and occupy a substantial portion of the panel aperture, said depressed portion being sheared from the body along two approximately opposite short lengths of its periphery and forming a detent and an abutment respectively, and a tongue the tip and sides of which are sheared and spaced from the body while the root is integral with the depressed portion at the abutment, the depressed portion and tongue being formed wholly within the body as a continuous deformation thereof from the detent to the tip of the tongue.

2. A clip as claimed in claim 1, in which the depressed portion comprises a downwardly convex area which in its entirety projects into the panel aperture.

3. A clip as claimed in claim 1, wherein the depression at its central portion is of approximately V section about an axis colinear with the longitudinal axis of the tongue.

4. A clip as claimed in claim 1, wherein the body is bowed, about a line transverse to the length of the strip so as to be concave with respect to the tongue.

ERIC BIRGER FERNBERG.

References Cited in the file of this patent

UNITED STATES PATENTS

| Number | Name | Date |
|---|---|---|
| 315,178 | Souter | Apr. 7, 1885 |
| 1,752,544 | Sparrow | Apr. 1, 1930 |
| 2,150,497 | Fernberg | Mar. 14, 1939 |
| 2,154,046 | Kost | Apr. 11, 1939 |
| 2,191,773 | Place | Feb. 27, 1940 |
| 2,200,047 | Tinnerman | May 7, 1940 |
| 2,227,290 | Wiley | Dec. 31, 1940 |
| 2,315,211 | Kost | Mar. 30, 1943 |
| 2,454,517 | Lisek | Nov. 23, 1948 |
| 2,566,886 | Hartman | Sept. 4, 1951 |
| 2,602,209 | Tinnerman | July 8, 1952 |